(12) United States Patent
Lake

(10) Patent No.: US 7,561,993 B2
(45) Date of Patent: Jul. 14, 2009

(54) REAL-TIME RENDERING OF A PARAMETRIC BREAKING WAVE

(75) Inventor: Adam Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 11/322,920

(22) Filed: Dec. 30, 2005

(65) Prior Publication Data

US 2007/0151336 A1 Jul. 5, 2007

(51) Int. Cl.
*G06F 17/10* (2006.01)
(52) U.S. Cl. ............................................. 703/2; 703/9
(58) Field of Classification Search ................ 703/2, 703/9; 345/585
See application file for complete search history.

(56) References Cited

OTHER PUBLICATIONS

Peachey D R: "Modeling waves and surf" Computer Graphics USA, vol. 20, No. 4, Aug. 1986, pp. 65-74.*
Manders et al., Wave patterns due to reflection in enclosed rotating and stratified fluids, Publication of the Royal Netherlands Institute for Sea Research, 2002, 3 pages.*
Darwyn R. Peachey, "Modeling Waves and Surf", Computer Graphics, vol. 20, No. 4, Dallas, Aug. 18-22, 1986, ISSN: 0097-8930, XP-002433624. pp. 65-74.
Gonzato, J-C et al., "On Modeling and Rendering Ocean Scenes Diffraction, Surface Tracking and Illumination", 7th International Conference in Central Europe on Computer Graphics, Visualization and Interactive Digital Media '99. In Co-operation with Eurographics and IFIP WG 5.10. WSCG '99. Conference Proceedings Univ. West Bohemia Pizen, Czech Republic, vol. 1, 1999, 10pgs. XP-002433625. ISBN: 80-7082-494-8.
Fournier, A. et al., "A Simple Model of Ocean Waves", Computer Graphics, vol. 20, No. 4, Dallas, Aug. 18-22, 1986. pp. 75-84, XP-002433626, ISSN: 0097-8930.
Max, Nelson L., "Vectorized Procedural Models for Natural Terrain: Waves and Islands in the Sunset", Computer Graphics, vol. 15, No. 3, Aug. 1981, pp. 317-324, XP-002433627, ISSN: 0097-8930.
"PCT International Search Report of the International Searching Authority", mailed Aug. 10, 2007, for PCT/US2006/048045, 6pgs.

* cited by examiner

*Primary Examiner*—Paul L Rodriguez
*Assistant Examiner*—Luke Osborne
(74) *Attorney, Agent, or Firm*—Buckley, Maschoff & Talwalkar LLC

(57) ABSTRACT

In some embodiments, a method is provided. A sinusoidal signal is generated that is representative of a wave at an average surface of a liquid. A distance between the average surface of the liquid and a bottom of the liquid is determined. A characteristic of the sinusoidal signal is adjusted as a function of the distance.

15 Claims, 12 Drawing Sheets

(LONG ATTRACTOR LINE)

(MEDIUM ATTRACTOR LINE)

(SMALLER ATTRACTOR LINE)

REAL-TIME RENDERING OF A PARAMETRIC BREAKING WAVE

BACKGROUND

The rendering of waves in video systems can be an important part of video graphics. When rendering "deep water" realizations of ocean waves, various equations to model deepwater wave behaviors are employed. "Deep water" can be generally defined as water wherein the distance between the average surface of the water and the bottom of the water, such as an ocean floor, is greater than or equal to half of a wavelength of a wave at the surface of the water, although other distances can be used.

However, waves in "shallow water" evince characteristics that are different than waves in deep water, which can create complications when trying to render shallow waves. "Shallow water" can be generally defined as water wherein the distance between the average surface of the wave and the bottom of the floor, is less than half of the wavelength of the wave at the surface of the water, although other distances can be used.

Furthermore, a "breaking" wave evinces characteristics that are different than either deep water waves or shallow water waves, which can create further complications when trying to render "breaking waves". "Breaking waves" generally refer to the curl of a wave, and can happen as a wave approaches a shore. Breaking waves can also occur as a function of a comparison of the wavelength of the wave to the distance between the average surface of the water and the bottom of the water, although other distances can be used.

DETAILED DESCRIPTION

For the purpose of various examples in the present Application, the several embodiments described herein are solely for the purpose of illustration. Some embodiments may include any currently or hereafter-known versions of the elements described herein. Therefore, persons in the art will recognize from this description that other embodiments may be practiced with various modifications and alterations.

Figure 1:
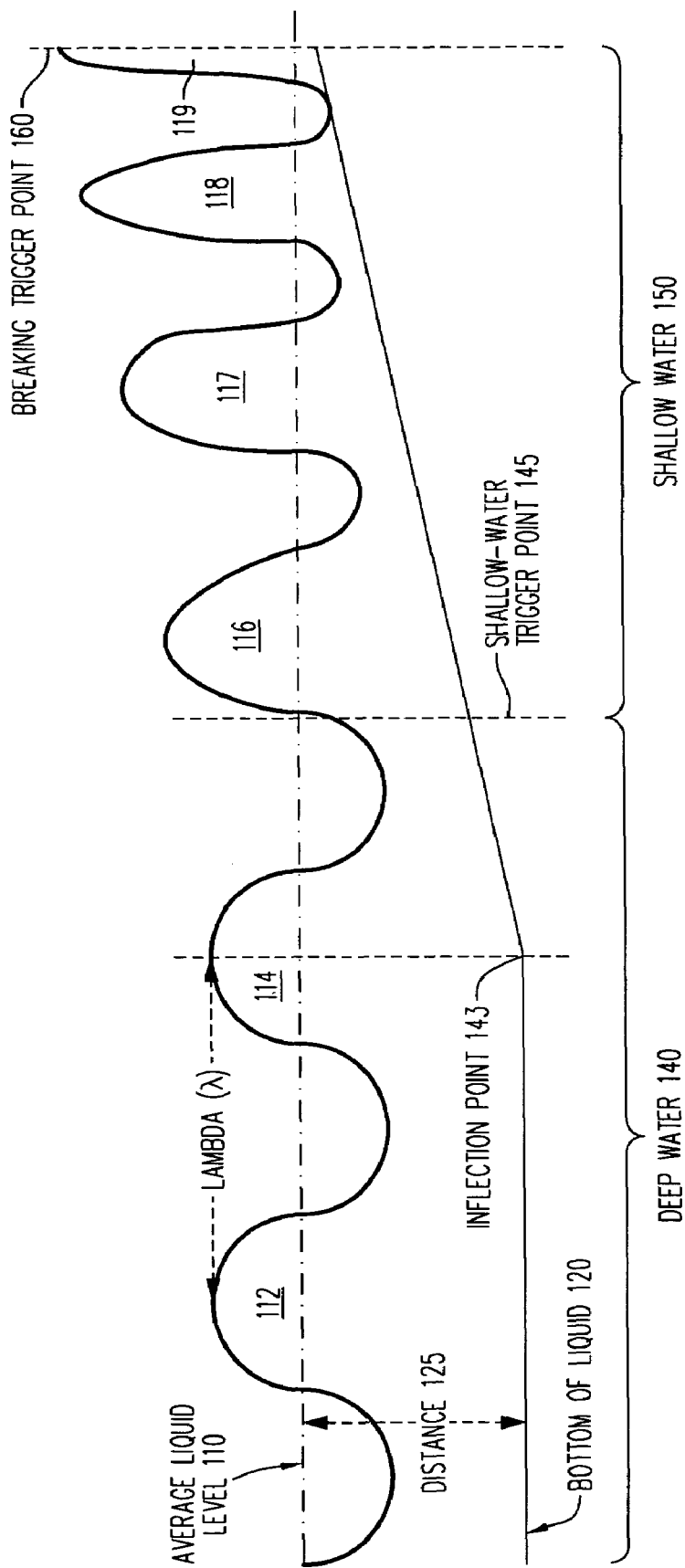
FIG. 1 is diagram of a deep water and shallow water in relation to an ocean floor.

FIG. 1 illustrates a plurality of waves 112, 114, and 116-119 in a simulation environment ("env.") 100. The behavior of each of the plurality of the waves 112, 114 and 116-119 can be the result of various variables, such as the distance between the average level of a liquid and the bottom of the liquid (i.e., a "depth" of the liquid), and the wavelength of each wave 112-119. In some embodiments, and for ease of illustration, the liquid referred to is water, such as ocean water, although other liquids can also be used.

Env. 100 has an average liquid level 110 and a bottom of the liquid 120 (e.g., an ocean floor). Env. 100 has a distance 125 that is a depth between the average liquid level 110 and bottom of liquid 120. For the ease of illustration, distance 125 is denoted as remaining substantially constant until an inflection point 143, after which distance 125 begins to lessen as the bottom of liquid 120 starts to approach the average liquid level 110.

Each wave 112-119 has a corresponding wavelength $\lambda$. In deep water 140, waves 112 and 114 each have substantially similar $\lambda$. In some embodiments, a shallow water trigger point 145 occurs when distance 125 is less than $\lambda/2$ of waves 112, 114, although other triggering criteria are also possible, such as other fractions of distances 125, or a selected distance to shore (not illustrated). In a shallow water 150, $\lambda$ can be altered to become progressively smaller with each wave 116-119 after hitting the shallow-water trigger point 145, and can be a function of a decreased distance 125, as will be described in more detail. Altering $\lambda$ for each wave 116-119 then can also change a correlated amplitude of wave 116-119 as well as other characteristics of these waves, as will be explained in more detail below.

Waves are generally rendered as advancing in a horizontal axis, such as shown in waves 116-119. Once a wave, such as wave 119, hits a breaking trigger 160, the wave, such as wave 120, then starts to break or "curl" as will be explained in more detail below in reference to FIGS. 6-13. In some embodiments, breaking trigger point 160 occurs when distance 125 is less than or equal $\lambda/7$ of waves 116-119 of deep water 140, although other triggering criteria are also possible, such as other ratios of $\lambda$, or a selected distance to shore (not illustrated).

Figure 2:
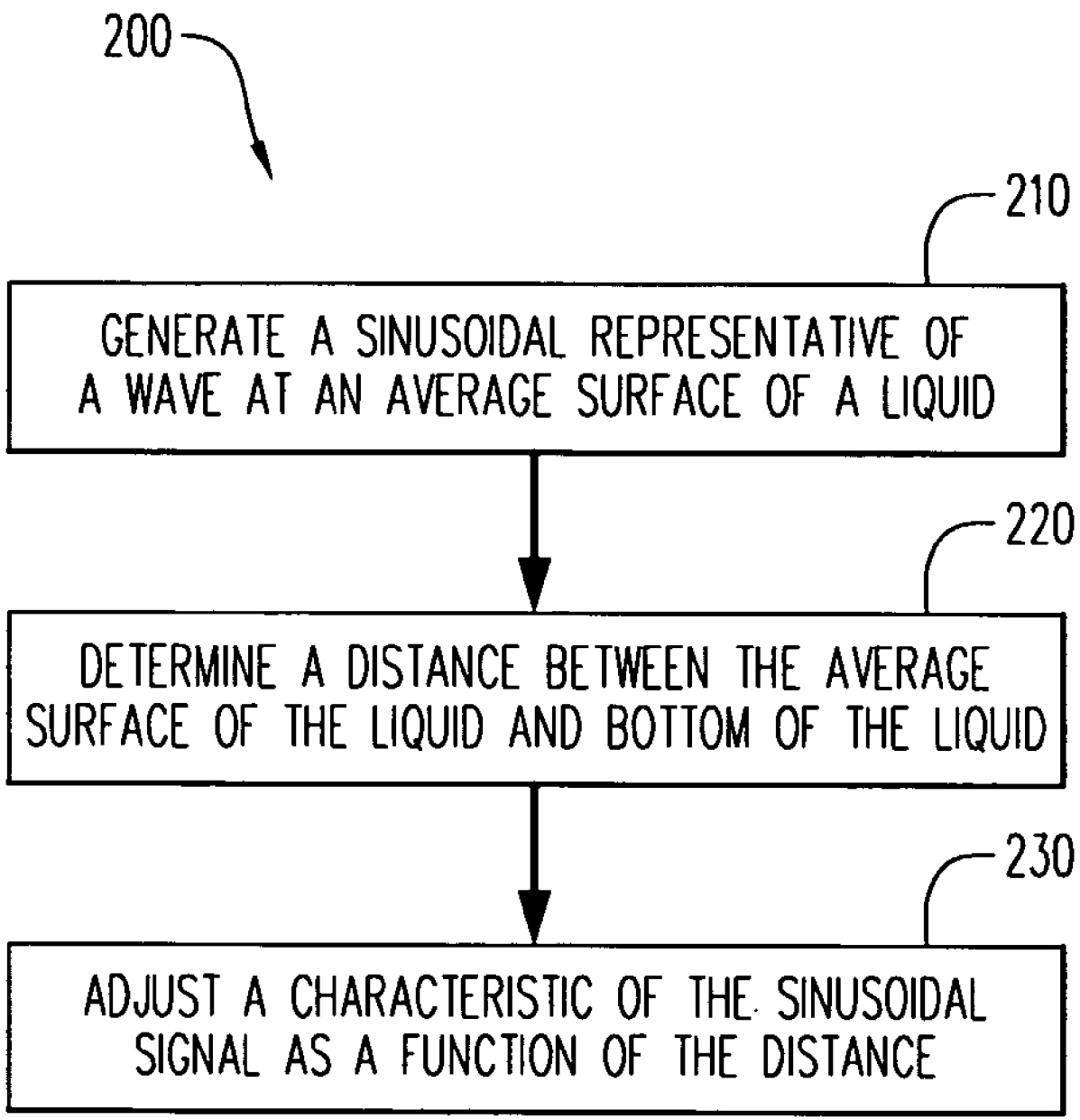
FIG. 2 is a flow chart of a generation of a simulation of a wave.

FIG. 2 illustrates a method 200 for generating a signal representing a wave in shallow water 150 according to some embodiments.

In 210, a sinusoidal signal is generated that is representative of a wave at an average surface of a liquid, such as average liquid level 110.

Then, in 220, distance 125 is determined between the average liquid level 110 and the bottom of the liquid 120. This can be in shallow water 150.

Then, in 230, a characteristic of the sinusoidal signal representative of the wave is adjusted as a function of at least distance 125.

In some embodiments, the characteristic to be adjusted is $\lambda$ of the wave 116-119, as will be described in more detail, below. In some embodiments, the characteristic to be adjusted is a speed of waves 116-119, as will also be described in more detail, below. In some embodiments, the characteristic to be adjusted is a height of a wave 116-119 as will also be described in more detail, below. In some embodiments, a second sinusoidal signal is generated that has the characteristics of an adjusted sinusoidal signal representative of the wave.

Figure 3:
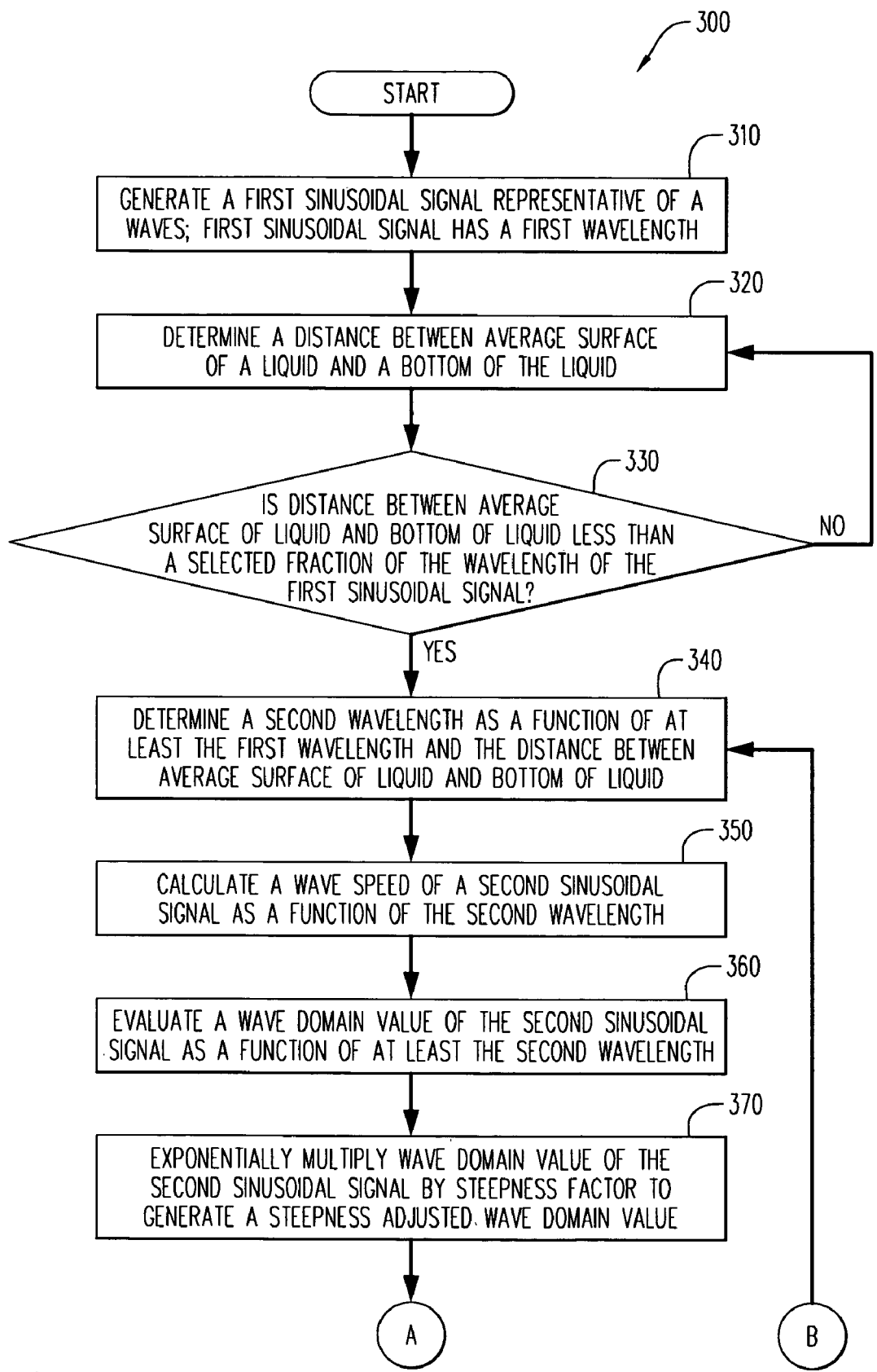
FIGS. 3 and 4 are a flow chart of a generation of a simulation of a wave as at least a function of the distance between an average depth of a liquid and the bottom of the liquid compared to a wavelength of the wave.
Figure 4:
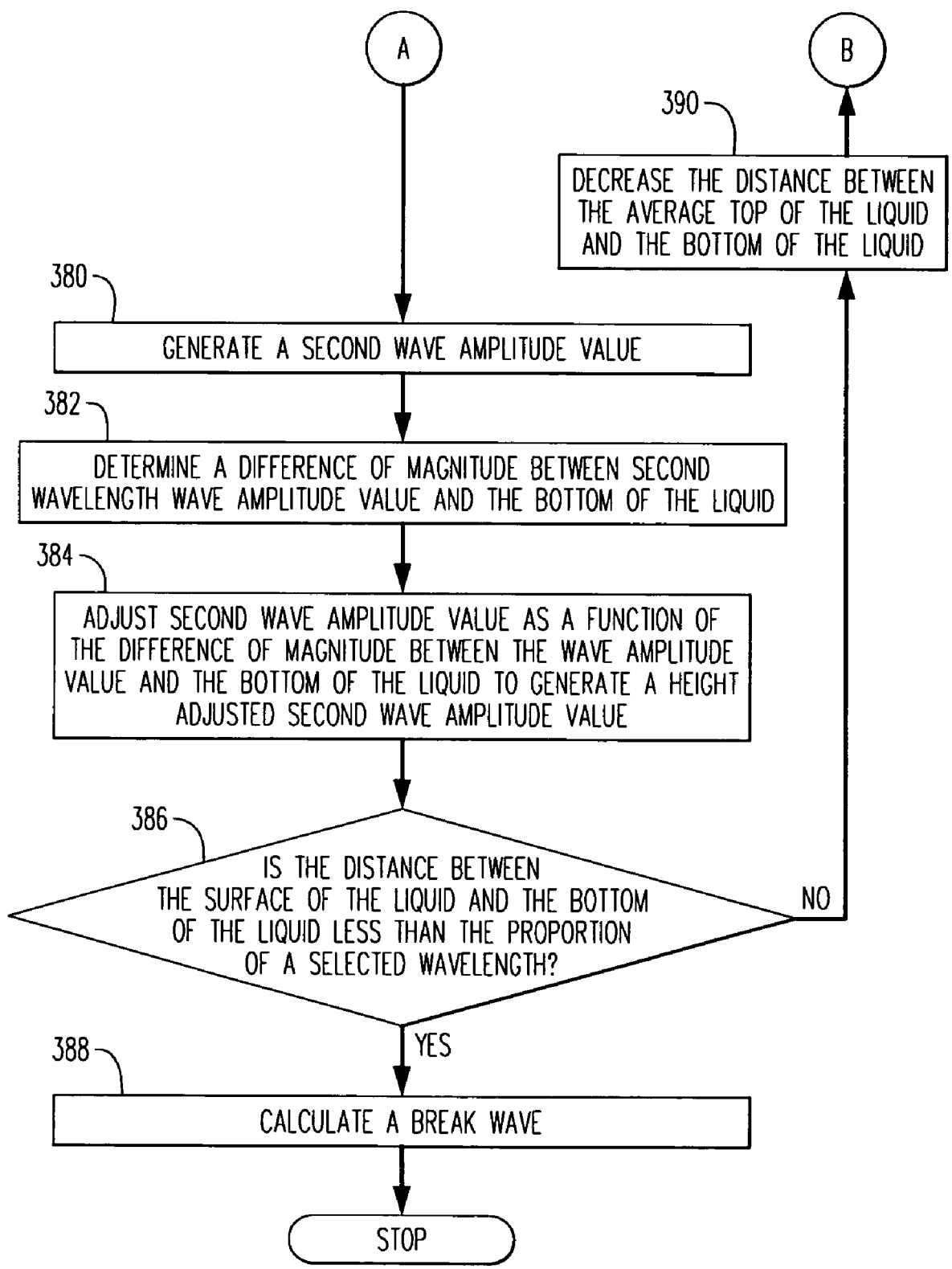

FIG. 3 illustrates a method 300 for generating a sinusoidal signal to emulate a behavior of a wave in shallow water 150. According to some embodiments FIG. 3 may illustrate aspects of 210-230 in more detail.

In 310, a first sinusoidal signal ("FSS") is generated that is represented of a wave. In some embodiments, the FSS is represented by $$f(x,t) = \text{Amplitude}_{multiplier} * [\{\sin(\omega x + t\phi) + 1\}/2]^{steepness}; \quad \text{Eqtn. 1A}$$

In Eqtn. 1A, Amplitude$_{multiplier}$ may be given as an initial constant, and is used in evaluating an amplitude of FSS. The Amplitude$_{multiplier}$ may also be the amplitudes of waves 112, 114, evaluated at their zenith, in deep water 140.

In Eqtn. 1A, Steepness is an exponential multiplier that is used in evaluating waves 116-119 of FSS and may be a function of distance 125, water salinity, and wind, for example. For waves 112, 114 in deep water 140, in some embodiments, the steepness factor can have a value of "1". For ease of explanation, the initial steepness factor of Eqtn. 1A as can be used in deep water 120 can be expressed as Steepness$_{first}$.

FSS has a first wavelength ($\lambda_{first}$), which can be equal to $2\pi/\omega$. Therefore, FSS can also be represented by:

$$f(x,t) = \text{Amplitude}_{multiplier} * [\{\sin([2\pi x/\lambda_{first}] + t\phi) + 1\}/2]^{steepness}. \quad \text{Eqtn. 1B}$$

FSS also has a first wave velocity S$_{first}$, which can generally be expressed as the horizontal speed at which a wave propagates across water level 110 in the "x" direction, i.e., an "x" parameter, such as towards a shore. FSS also has a characteristic "$\phi$", called the phase velocity which may be a function of S$_{first}$ times $2\pi/\lambda$, such as $2\pi/\lambda_{first}$. In Eqtn. 1B, "t" may be a time parameter.

For deep water 140 (i.e., before adjusting for depths 125 of shallow water 150) . . .

$$\phi = S_{first} * 2\pi/\lambda_{first}. \quad \text{Eqtn. 1C.}$$

In Eqtn. 1C:.($\phi$) has units of radians/ second. $\phi$ is used within FSS by multiplying by "t", to achieve a phase displacement "$\phi t$."

In 320, a distance is determined between an average surface of a liquid and a bottom of the liquid for a wave. In some embodiments, the distance is distance 125, the top of the liquid is average liquid level 110, and the bottom is bottom of the liquid 120.

At 330, it is then determined if the distance, between the average surface of a liquid and bottom of a liquid is equal to or less than a selected fraction of the wavelength of the FSS. For example, in 330 it is determined if distance 125 is less than or equal to $\lambda_{first}/2$ of wave 114 for a given wave. In other words, in some embodiments, it is determined whether wave 112, 114, 116 has arrived at shallow water trigger point 145 as the wave propagates across average liquid level 110. If distance 125 is less than or equal to $\lambda_{first}/2$ of wave 114, 320 advances to 330. If not, 320 is again re-executed for another wave, which can be elsewhere on the liquid surface, such as average liquid level 110. In other embodiments, the wave can also propagate across the average liquid level 110 in the "x" direction to be reevaluated.

In 340, a second wavelength ($\lambda_{second}$) of a second sinusoidal signal (SSS) is determined as a function of at least $\lambda_{first}$ of the FSS and a distance between the average surface of a liquid and a bottom of a liquid. In some embodiments, average surface is average liquid level 110, bottom of liquid is ocean floor 120, and distance is distance 125. In some embodiments, $\lambda_{second}$ is a value between $\lambda_{first}$ and half of $\lambda_{first}$. For ease of illustration, $\lambda_{second}$ will be shown as "$b\lambda_{first}$", with "b" multiplying $\lambda_{first}$ by a value, such as from one to one half, to more clearly illustrate a relationship between $\lambda_{first}$ and $\lambda_{second}$. However other values of "b" can be used in other embodiments.

In some embodiments, the value of "b" is a linear function of distance 125. In some embodiments, the value "b" could be calculated as {(distance 125$-\lambda_{first}$)/(distance 125$+\lambda_{first}$)}$+$ constant.

In 340, SSS can then be initially expressed as . . . :

$$f(x,t) = \text{Amplitude}_{multiplier} * [\{\sin([2x/(b\lambda_{first})] + t\phi) + 1\}/2]^{steepness}. \quad \text{Eqtn. 2.}$$

A wave speed S$_{second}$ of the SSS can be calculated as a function of $\lambda_{second}$ (i.e., $/(b\lambda_{first})$ in 350. In some embodiments, $\phi$ should maintain the same value between Eq. 1 and 2, even though their respective wavelengths, (i.e., $\lambda_{first}$; and $\lambda_{second}$, {$\lambda_{second}$ which can also be expressed as $b\lambda_{first}$}), are different. Therefore, $$S_{first} * 2\pi/\lambda_{first} = \phi = S_{second} * 2\pi/\lambda_{second} \text{ or,} \quad \text{Eqtn. 3a.}$$

$$S_{second} = (S_{first} * 2\pi/\lambda_{first})/(2\pi/\lambda_{second}) \text{ or} \quad \text{Eqtn. 3b.}$$

$$S_{second} = (S_{first} * \lambda_{second}/\lambda_{first}.) \text{ or,} \quad \text{Eqtn. 3c.}$$

$$S_{second} = S_{first} * b. \quad \text{Eqtn. 3d.}$$

In other words, in some embodiments, the wave velocity ("S",) of each wave decreases in proportion as the distance 125 decreases (S$_{first}$ and S$_{second}$) of the waves.

In 360, a wave domain value (WDV) of the SSS is evaluated. Generally, WDV is the evaluation of values in the domain of a sinusoid. In some embodiments, this can be represented by an evaluation of [{sin([$2\pi x/(b\lambda_{first})$]+t$\phi$)+1}/2. As is illustrated, WDV of the SSS is a function of at least $\lambda_{second}$ (i.e., $b\lambda_{first}$). In some embodiments, the time "t" is also employed in evaluating WDV of the SSS. In some embodiments, the time "t" is left as a variable within the wave domain value.

In 370, WDV of the SSS is to exponentially multiplied by the steepness value to generate a steepness adjusted wave domain value. In some embodiments, the steepness value may be steepness$_{second}$ value steepness$_{second}$ may be a value between 1 and 10, for example. Steepness$_{second}$ can be a function of distance 125, a distance between wave 116-119 and a shore (not illustrated), and other factors.

$$\text{steepness adjusted wave domain value} = [\{\sin([2\pi x/(b\lambda_{first})] + t\phi) + 1\}/2]^{steepness\_second}. \quad \text{Eqtn. 4a.}$$

In 380, in some embodiments, the steepness adjusted wave domain value created by steepness$_{second}$ is then multiplied by Amplitude$_{multplier}$ to create a second wavelength wave amplitude. In some embodiments, the second wavelength wave amplitude may be expressed as:

$$f(x,t) = \text{Amplitude}_{multiplier} * [\{\sin([2\pi x/(b\lambda_{first})] + t\phi) + 1\}/2]^{steepness\_second}. \quad \text{Eqtn. 4b.}$$

Then, in 382, a difference of magnitude between the second wavelength wave amplitude and the bottom of the liquid, such as distance 125, is determined. For ease of explanation, the difference of magnitude between the second wavelength wave amplitude and the bottom of the liquid is referred to as a second wavelength wave amplitude distance.

In 384, the second wavelength wave amplitude is adjusted as a function of the difference of magnitudes between the second wavelength wave amplitude and the bottom of the liquid determined in 382 to generate a height-adjusted second wavelength wave amplitude.

For example, in some embodiments, the height of the amplitude of a wave, such as waves 116-119 in shallow region 140, is adjusted as a function of a difference in magnitudes the second wavelength wave amplitude and distance 125.

In some embodiments of 384:

If distance 125<second wavelength wave amplitude
{f(x,t)} then: height adjusted f(x,t)=f(x,t)+[f(x,t)−
bλ$_{first}$]  Eqtn. 5.

In other words, if distance 125 is less than the second wavelength wave amplitude of Eqtn. 4b, then the difference of magnitude between the second wavelength wave amplitude and the bottom of the liquid of Eqtn. 4b is added to the second wave evaluated amplitude value, to generate a height-adjusted second wavelength wave amplitude.

In 386, it is then determined if the distance between the surface of the liquid and the bottom of the liquid, such as average liquid level 110 and ocean floor 120, is less than a second selected proportion of a wavelength, such as λ$_{first}$ or λ$_{second}$. If it is not less than a second selected proportion of a wavelength, 386 advances to 390. If it is, 386 advances to 388.

In 388, a break wave is calculated, as will be described in more detail in reference to FIGS. 6-9 and 11, below.

In 390, in some embodiments, the distance between the top of the liquid and the bottom of the liquid, such the distance 125 between average liquid level 110 and bottom of the liquid 120, is decreased. In some embodiments, the distance is decreased as a function of a distance between wave 116-119 and shore. In some embodiments, decreasing the distance can represent the propagation of a wave in the horizontal direction.

Figure 5:
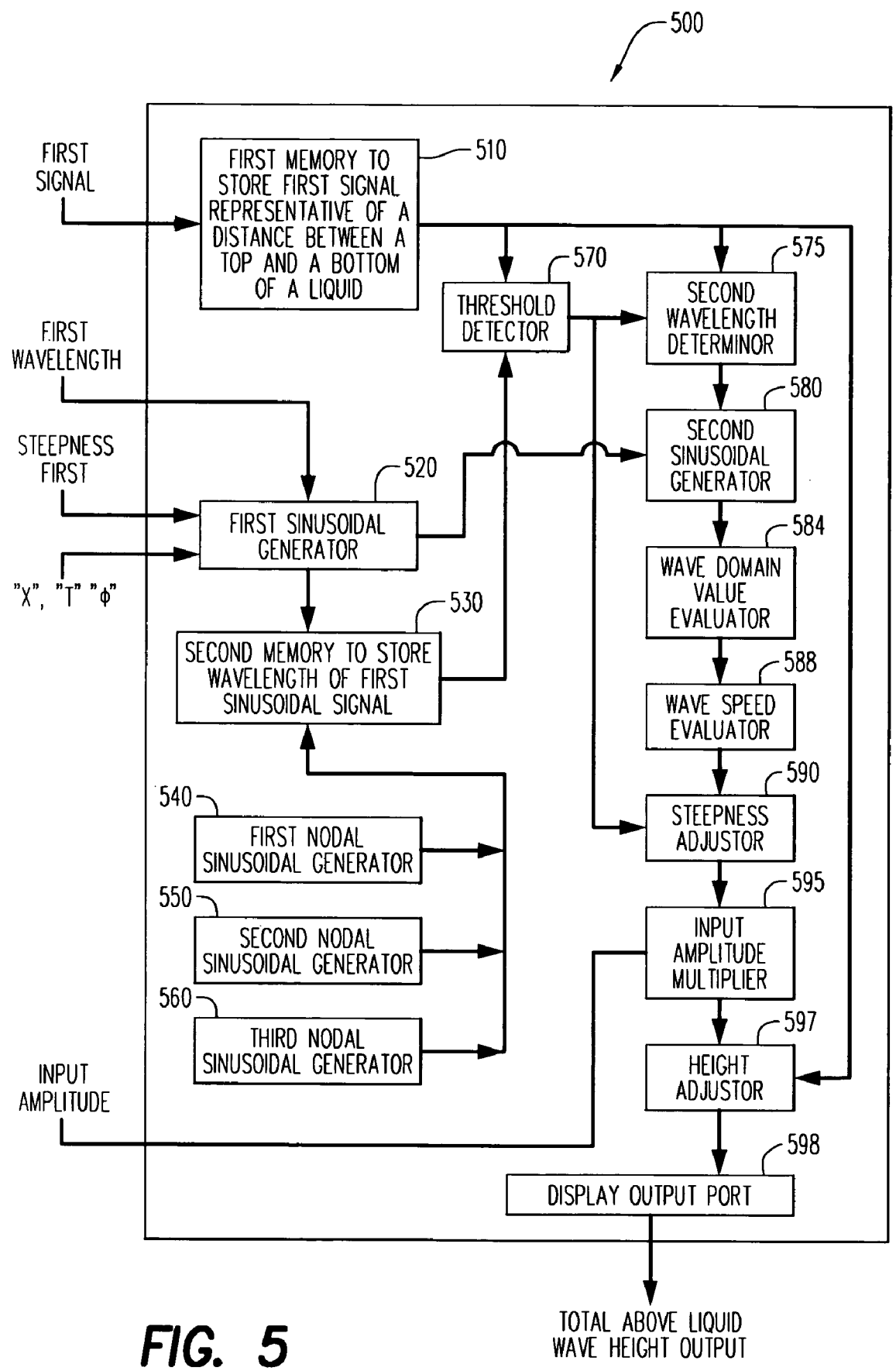
FIG. 5 is a system for generating a signal representing at least one wave in a shallow liquid.

FIG. 5 illustrates a system 500 for determining characteristics of sinusoidal waves. In some embodiments, a plurality, such as four, sinusoidal waves can be generated simultaneously. Also, although, in some embodiments, method 200 and 300 can be performed in system 500, other methods may be performed by other embodiments of system 500. For ease of illustration, some aspects of system 500 will be described in reference to method 300. However, in some embodiments, other aspects of system 500 can also be used in conjunction with method 300 or 200.

A first signal is received at a first memory 510. The first memory 510 is used to store the first signal that is representative of a distance between a top and a bottom of a liquid, such as may be determined in 310. The memory 510 is coupled to a threshold detector 570, a second wavelength determinor 575, and a height adjustor 597.

The first wavelength (λ$_{first}$) is received at a first sinusoidal generator 520. Also, wave speed S$_{first}$ is also received at the first sinusoidal generator 520. Steepness$_{first}$ is also received by first sinusoidal generator 520. In some embodiments, the displacement of the wave in an "x" direction and a phase are also received at the first sinusoidal generator, as is time "t" and phase velocity "φ". The generator 520 is coupled to a second memory 530 to store λ$_{first}$ of a first sinusoidal signal generated by first sinusoidal signal generator, such as may occur in 310.

In some embodiments, nodal sinusoidal generators 540 to 560 are also coupled to second memory 530. These can be used to generate additional sinusoidal signals. These signals can be added to the first sinusoidal signal to generate an aggregate second wavelength wave amplitude.

The threshold detector 570 compares the first signal from first memory 510 to a proportion of λ$_{first}$, such as may occur in 330. If the first signal from first memory 510 is compared to a selected proportion of λ$_{first}$, and the first signal is equal to or less than this proportion, threshold detector 570 initiates/triggers a calculation of a coupled second wavelength determinor 575.

Second wavelength determiner 575 then determines the second wavelength as a function of first signal and λ$_{first}$, such as may occur in 340. Second wavelength determinor 575 then passes λ$_{second}$ to a second sinusoidal generator 580.

Second sinusoidal generator 580 receives input from both second wavelength determiner 574 and first sinusoidal generator 520 to generate SSS as may be represented Eq. 2. In some embodiments, 340 occurs in second sinusoidal generator 580. SSS is conveyed to wave domain value evaluator 584.

Wave domain value evaluator 584 evaluates the wave domain value of SSS as a function of at least λ$_{second}$ (i.e., bλ$_{first}$). In some embodiments, 340 occurs in wave domain value evaluator 584. The wave domain value is conveyed to a wave speed evaluator 588. In some embodiments, wave domain value evaluator employs input, such as "x" and "t", given to the first sinusoidal generator 520.

Wave speed evaluator 588 generates S$_{second}$ as a function of at least both φ and λ$_{second}$. In some embodiments, 340 occurs in wave speed evaluator 588. An output of evaluator 580 is conveyed to a steepness adjustor 590.

Steepness adjustor 590 generates steepness$_{second}$. In some embodiments, 370 may occur in 590. In some embodiments, steepness adjustor 590 generates steepness$_{second}$ as a function of λ$_{second}$. In some embodiments, steepness adjustor 590 can also use other factors, such as distance to shore and wind velocity, to generate steepness$_{second}$. Steepness adjustor 590 can generate a steepness adjusted wave domain value from steepness$_{second}$. The steepness adjusted wave domain value is conveyed to an input amplitude multiplier 595.

Input amplitude multiplier 595 receives as input the amplitude$_{initial}$. Input amplitude multiplier 595 multiplies the steepness adjusted wave domain value with the amplitude$_{initial}$ together to generate a second wavelength wave amplitude. In some embodiments, amplitude multiplier 595 performs 380. Input amplitude multiplier 595 conveys the second wavelength wave amplitude to a height adjustor 597.

The height adjustor 597 is coupled to first memory 510 and input amplitude multiplier 595. The height adjustor 597 adjusts the second wavelength wave amplitude as a function of a difference of magnitude between the wave amplitude value and a bottom of the liquid to generate a height adjusted second wavelength wave amplitude. This height adjusted wave amplitude value can represent a final wave height above average water level height. In some embodiments, 386 can occur in height adjustor 597. In some embodiments, 390 also occurs in height adjustor 597. Then, in some embodiments, the height adjusted second wavelength wave amplitude is conveyed through a display output port 598. Display output port 598 then conveys the height-adjusted second wavelength wave amplitude for rendering.

Figure 6:
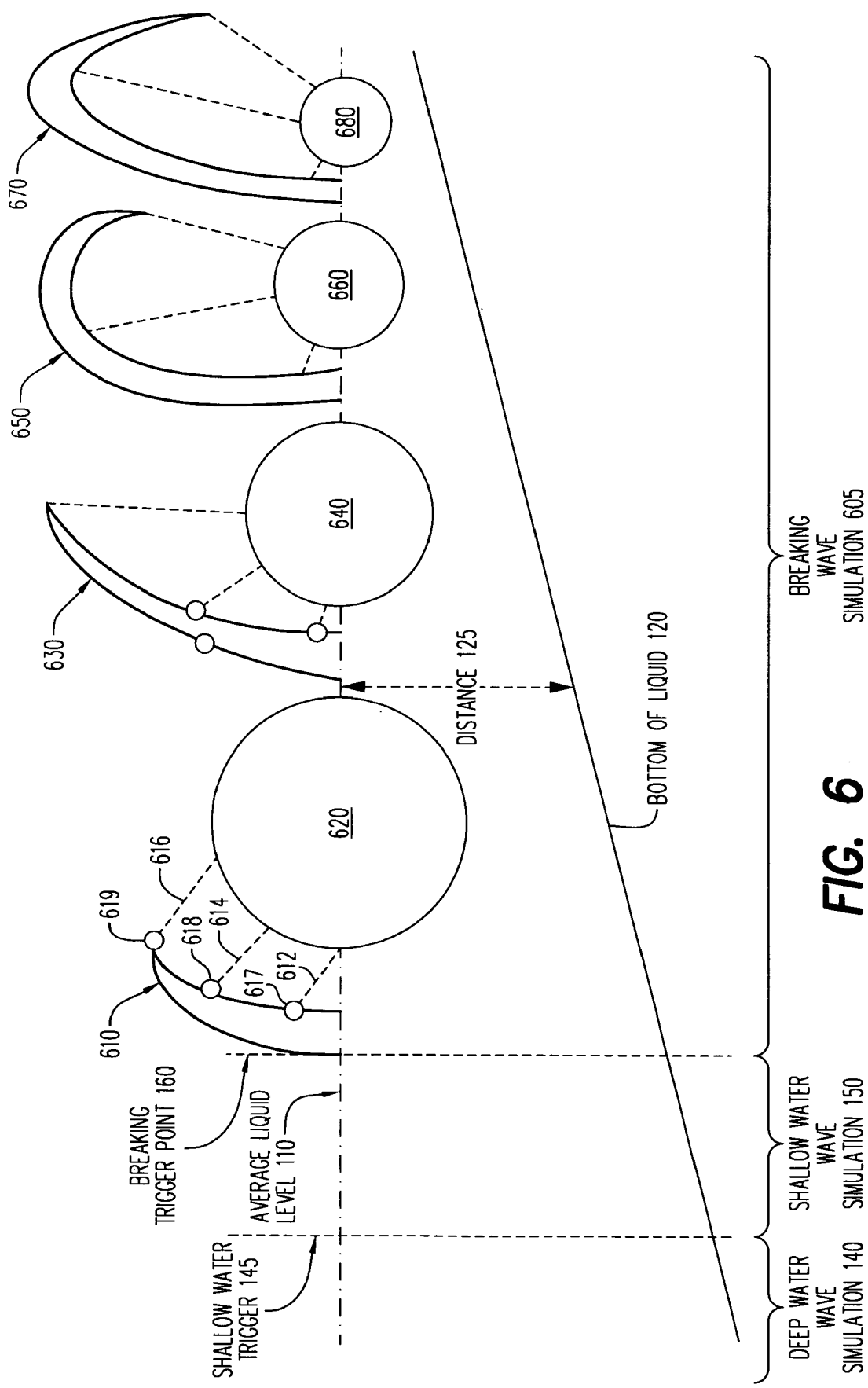
FIG. 6 illustrates a modifying of a "breaking" wave through use of an attractor an and an attractor line.

FIG. 6 illustrates a simulation environment 600 for modeling a curling a wave in breaking wave simulation 605. A plurality of waves 610, 630, 650 and 670 are illustrated. Each wave becomes successively more curled as the distance 125 becomes shorter for each wave 610, 630, 650 and 670. Each wave 610, 630, 650 and 670 has its corresponding attractor 620, 640, 660 and 680, which is used in modeling the behavior of a point on a wave ("wave point"), such as wave points 617, 618, and 619, as will be described in more detail below. Each wave 610, 630, 650 and 670 represent different stages of curl of a wave that is propagating at the average liquid level 110 along the "X" axis. The curl can be a function of a wave approaching shore, the distance 125 for the wave, or other factors. The curl can begin after a simulated wave reaches a breaking trigger point 160.

Generally, a line ("attractor line"), such as attractor line 612, is drawn between a wave point, such as wave point 617, and an "attractor", such as the attractor sphere 620. The attractor line 612 represents the shortest distance between the wave points, such as 617, 618, and 619 and attractor sphere 620. In some embodiments, attractor line 612 touches both wave point 617 and attractor sphere 620.

In simulation environment 600, a wave point, such as wave point 617, is then constrained to move in a direction and/or a velocity that is a function of its corresponding attractor line, such as attractor line 612. For example, wave point 637 can be constrained to move in the direction and/or a velocity that is a function of its corresponding attractor line, such as attractor line 632, which may be attractor line 612 changed in length and direction.

In some embodiments, the attractor line constrains the direction in which a wavepoint can instantiate. In other words, when the first wave 610 becomes second wave 630, the wave point 617 of the first wave can appear on a point with line attractor 612. Wave point 617 then becomes wavepoint 637 of wave 630. In other embodiments, such as of the simulation environment 600, the attractor line, such as attractor line 612 is a direction in which a simulated force is applied to its corresponding wavepoint, such as wavepoint 617, but the wavepoint still has simulated inertia from a previous rendering of the wave 610. In still other embodiments, the wavepoint has a speed $S_{second}$, and a previous vector heading from its simulated inertia, but the force is a function of the length of the attractor line. In still other embodiments, the velocity of the wavepoint can be a function of the elasticity of the attractor line 612.

The distance to the attractor sphere 620 from wave point 614 can be varied over time, as will be described below, and the speed of attractor spheres 620, 640, 660, 680 and corresponding waves 610-670 may be a function of $S_{second}$ as well. Note that, in the event that the wave is moving in an "x" direction (as illustrated in FIG. 6), the wavepoint may appear to move forward like a pebble on a string, rotating around the attractor sphere.

In some embodiments, as a variable, such as distance 125 or a distance between a simulated wave and shore, changes, the attractor sphere 620, 640, 660, or 680 shrinks. In some embodiments, this shrinkage can change the vector orientation of its attractor line, which in turn can change the simulated forces applied to the wave point. Generally, as the attractor spheres 620-680 continue to shrink, the curl of its corresponding wave becomes more pronounced.

Figure 7:
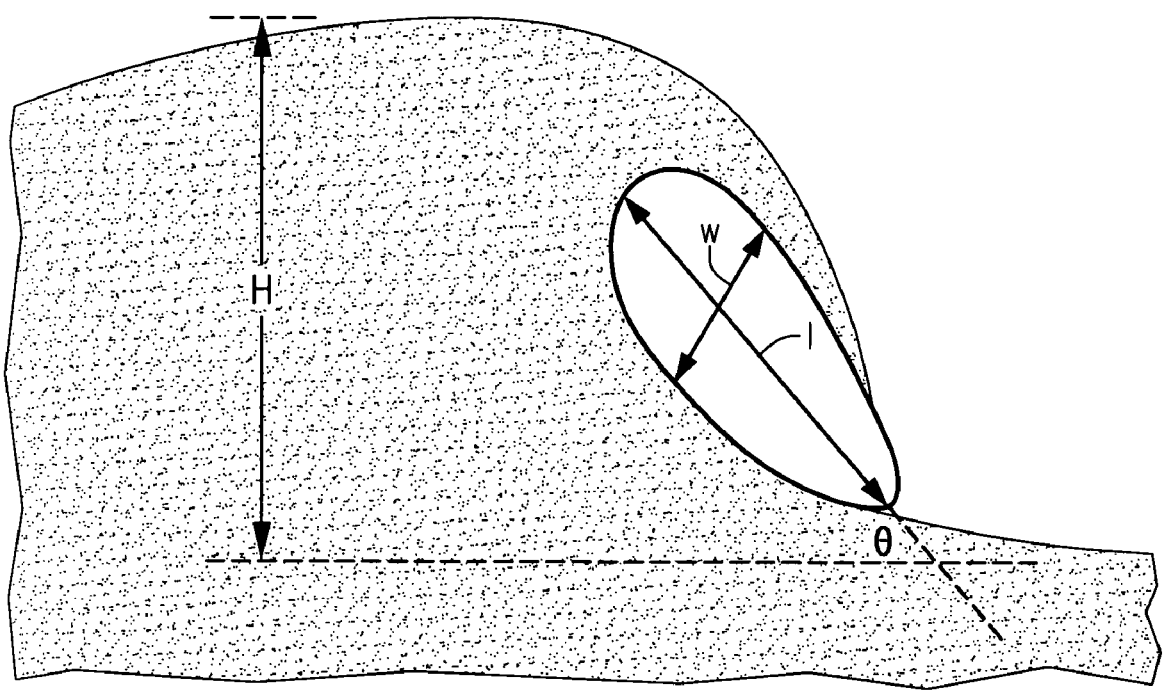
FIG. 7 illustrates a wave vortex having a length and a width attribute.

FIG. 7 illustrates a vortex of a wave. The vortex has a width "w", a length "l" and an angle θ. This represents one embodiment of an attractor. In some embodiments, an attractor can be an rendered as an attractor sphere. "W", "L" and angle θ can be factors of geography, water temperature, and so on. Examples of varying proportionality between width "W" and length "L" can vary from a proportionality of length of width to length ratios of 1.6 to 3.1, for example. Although the attractor is modeled as occurring as a sphere at water level, with a W to L, of 1:1 in other embodiments, other shapes and placements may be used for the determination of lengths and orientations of attractor lines.

Figure 8:
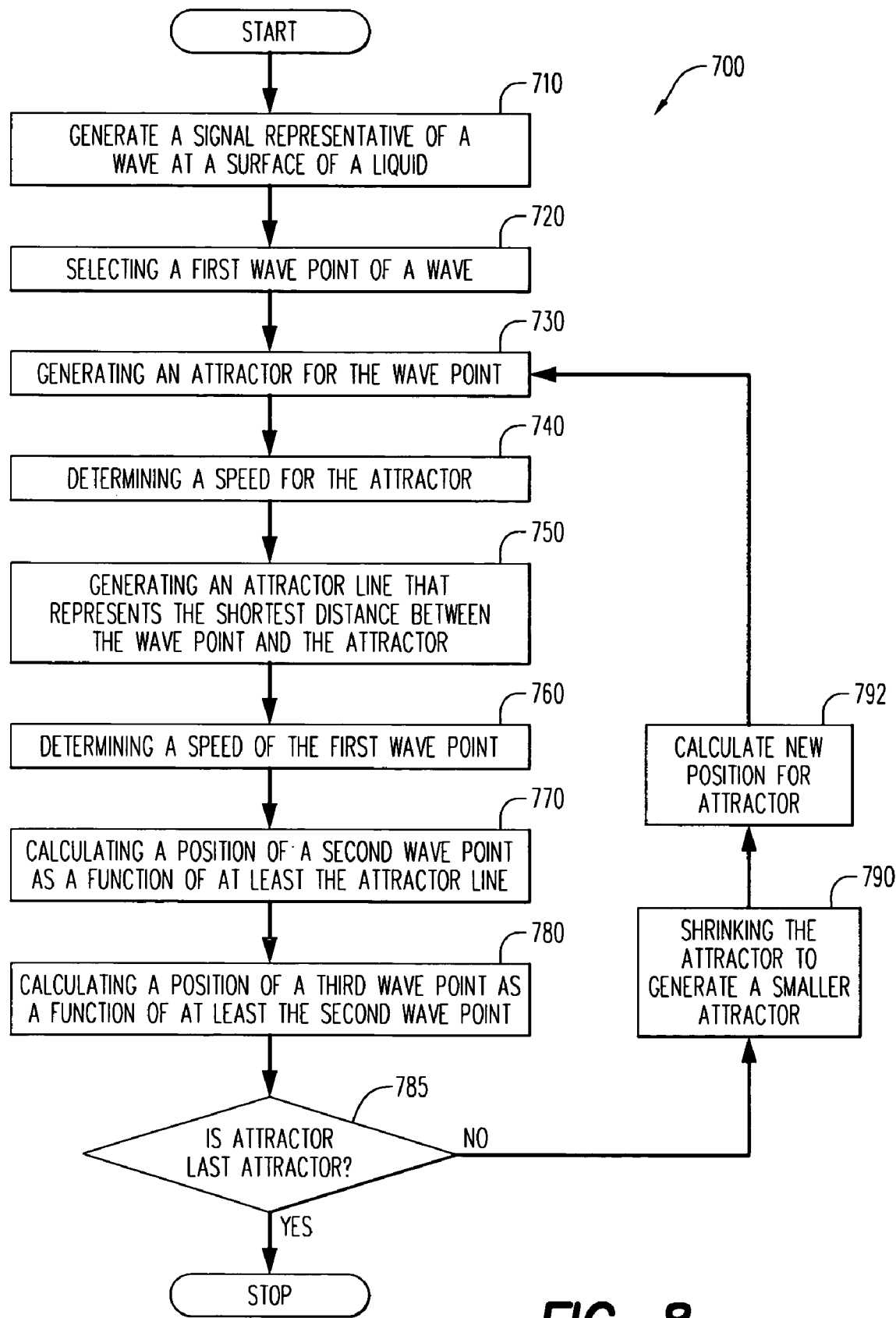
FIG. 8 illustrates a method for generating signals representative of a breaking wave using an attractor and an attractor line.

FIG. 8 illustrates a method 700 for curling a wave. In some embodiments, the method 800 occurs in breaking water.

In 710, a signal is generated that is representative of a wave at a surface of a liquid. This can be wave 610 at average liquid level 110.

In 720, a first wave point of the wave is selected. For example, wave point 618 is selected.

In 730, an attractor, such as attractor sphere 620, is generated for the wave point. The attractor sphere can be a sphere, or can be other shapes of attractors in other embodiments. The radius of the attractor can be a function of distance 125, a distance to shore, or other factors. The attractor may be placed at a selected point along the x axis. In some embodiments, the attractor may be placed either so that average liquid 110 bisects the attractor, so that the attractor is tangent above or below the attractor, or other placements.

In 740, in some embodiments, a speed of the attractor is determined. This can be a function of the speed of a previous attractor, or received as an input. For instance, a speed of attractor 640 can be at least partially a function of the speed of attractor sphere 620.

In 750, an attractor line, such as attractor line 612, is generated that represents the shortest distance between a wave point, such as wave point 617, and an attractor sphere 640. In some embodiments, the attractor line may be represented as:

$$v_1+(v_2-v_1)*t \qquad \text{Eqtn. 6}$$

Wherein $v_1$ is a position of the first wave point, $v_2$ is a position on an attractor, (the closest point on the attractor), and "t" is a parameter that varies according to wind, distance to shore, salinity, etc.

In 760, a speed of the first wave point is determined. This can be the result of a use of a previous attractor line, or received as initial inputs. In some embodiments, a vector direction of the wave point may also be determined.

In 770, a second wave point position, such as 630, is calculated as a function of at least the attractor line calculated in 750, as detailed above. For instance, wave point 617 may became wave point 637. In some embodiments, 780 is repeated for a plurality of wave points, such as 614 to 618, thereby generating a simulation of a leading edge of a breaking wave.

In 780, in some embodiments, a third wave point, part of the same wave of which the second wave point is a member, is also calculated. The calculation of the third wave point, such as third wave point 659, is a function of at least the position of the second wave point 655. In some embodiments, the third wave point 659 is an interpolated wave point, and may not be on the leading edge of a breaking wave. In some embodiments, the second wave point is then regarded as the first wave point.

In 785, it is determined if the attractor generated is the last attractor. For instance, is the wave continuing to curl? If it is, method 700 stops. If not, 785 advances to 790.

In 790, in some embodiments, the attractor is shrunk to generate a smaller attractor, such as attractor sphere 640. The shrinking can be a function of a change of a new distance to shore, a new distance 125, or other factors.

In 792, the smaller attractor is then placed in a new position. The new position can be a function of the speed of the attractor. 792 loops back to 730.

Figure 9:
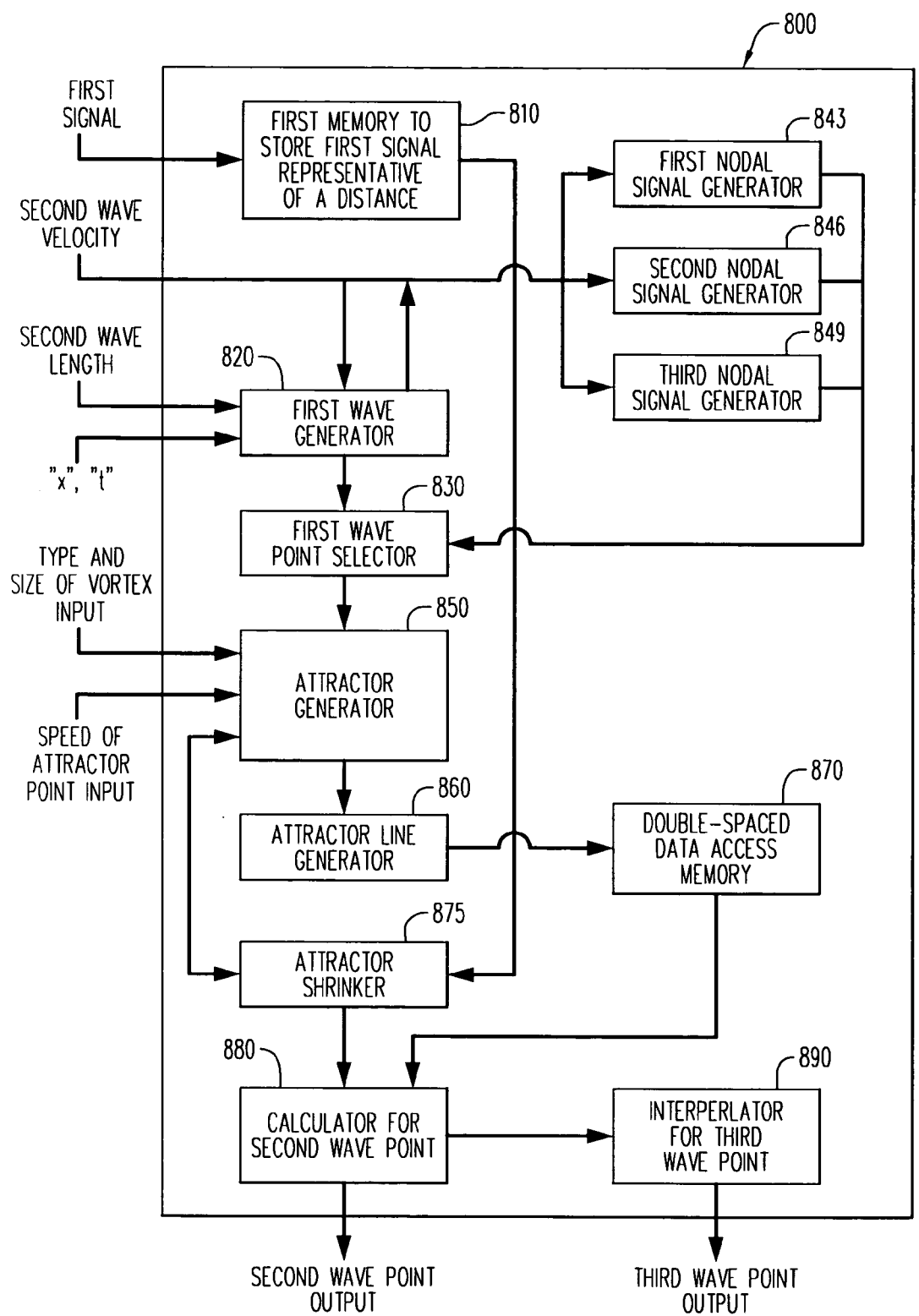
FIG. 9 illustrates a system for generating a signal representing at least one breaking wave.

FIG. 9 illustrates one embodiment of a system 800 for rendering a curl of a wave as illustrated in FIG. 6. Although system 800 may be described in reference to method 700, other methods may be used with system 800 in other embodiments.

A first memory 810 is used to store a signal representative of a distance from water level to liquid bottom, such as distance 125. Second wavelength ($\lambda_{second}$) and $S_{second}$ is input into first wave generator 820, as are "x" and "t". A signal representative of a wave at the surface of a liquid output, such as in 710, of first wave generator 820 is input into a first wave point selector 830. The wave point selected is then conveyed to the attractor generator 850, as may occur in 720.

In some embodiments, a first nodal signal generator 842, a second nodal signal generator 844, and a third nodal signal generator 846 are also used to generate additional breaking waves and are also coupled to second wavelength ($\lambda_{second}$) and $S_{second}$.

Attractor generator 850 receives input data, such as the type (sphere, non-sphere) and size of the attractor as input to help generate the attractor. In some embodiments, attractor generator 850 performs 730 of process 700. The attractor can be placed as bisected by the average level of the liquid, tangent to the liquid at the bottom of a wave, tangent below the average level of the liquid. The attractor generator 850 also receives a speed of the attractor, such as in 740, that is used to later displace the attractor along an axis across the surface of the liquid, such as is illustrated in FIG. 6 and in 792.

Then, an attractor line generator 860 receives the first point from first wave point selector 830 and an attractor from attractor generator 850. Attractor line generator 850 may generate an attractor line. As discussed above, the attractor line represents the shortest distance between the wave point and the attractor. In some embodiments, the attractor line is then stored in a double speed data access memory 870.

The attractor shrinker 875 receives an attractor from attractor generator 850 and may both displace the attractor along horizontal axis and also shrink the attractor to generate a smaller attractor, such as in 790. The shrinking of the attractor can be a function of the first signal, the distance to shore of the attractor, the second wavelength, or other factors. In other embodiments, the attractor line generator 870 generates an attractor line after a shrinking the attractor.

A calculator for a second wave point ("calculator") 880 uses the attractor line generated by attractor line generator 850 and the first wave point selected by first wave point selector 830 to determine a position of a second wave point. In some embodiments, first, calculator 880 selects a speed of the first wave point, as in 760. Then, as is 780, the position of the second wave point is calculated. This value is then output as second wave point output. Alternatively, In some embodiments, an interpolator 890 for a third wave point, such as wave point 659 is also used. Generally, the interpolator 890 looks at speed and orientation data of the second wave point, and bases the speed and orientation for a third point of the wave on this data. For example, a wave point on the back of the wave having the same amplitude as the second wave point, could be moved with the same speed and in the same direction as the first wave point. This is then output as third wave point output.

Figure 10:
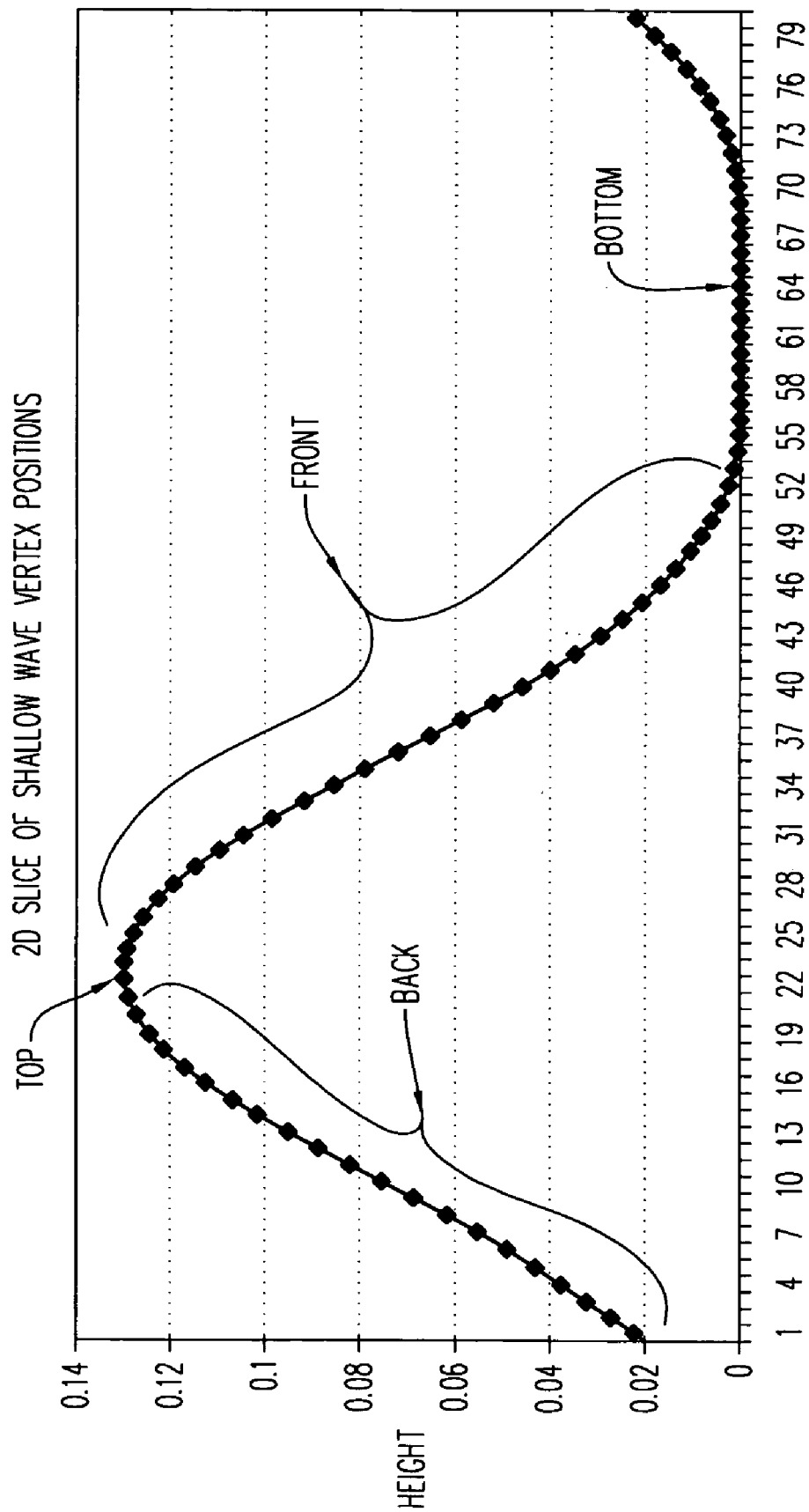
FIG. 10 illustrates parts of a shallow water wave or breaking wave used in interpolating new points for the shallow water or breaking wave.

FIG. 10 illustrates a two-dimensional shallow water wave vertex position. In FIG. 10, a wave has a bottom, a front, a top, and a back. Each wave point within the wave in FIG. 10 would then be moved in the X direction as a function of $S_{second}$. However, each wave point would then be curled around an attractor (not shown) as a function of, for instance, the attractor line. In FIG. 10, in some embodiments, the back wave points could be calculated/interpolated as a function of the speed of a corresponding front wave point and their own speeds.

Figure 11:
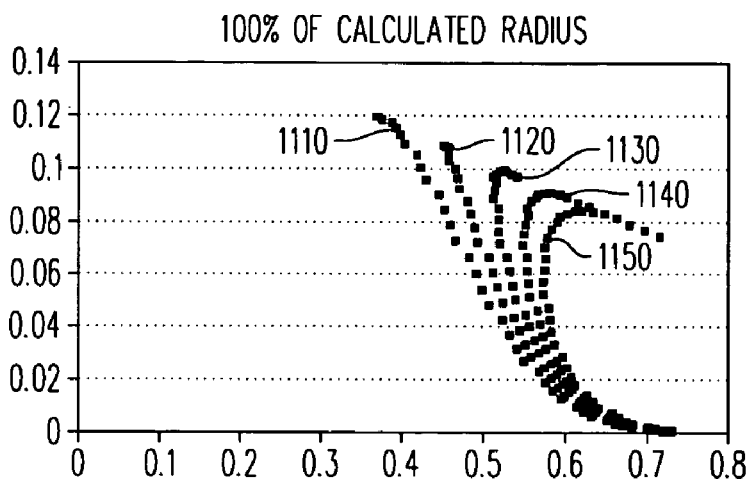
FIGS. 11-13 illustrate various wave vortex behaviors as a function of differing variables of a vortex.
Figure 12:
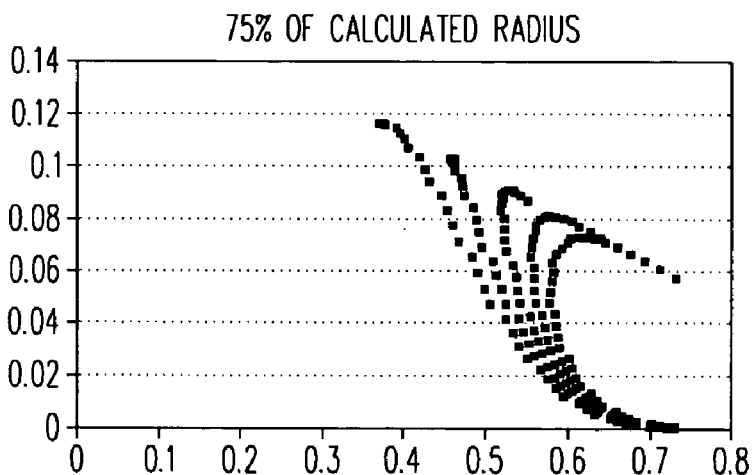
Figure 13:
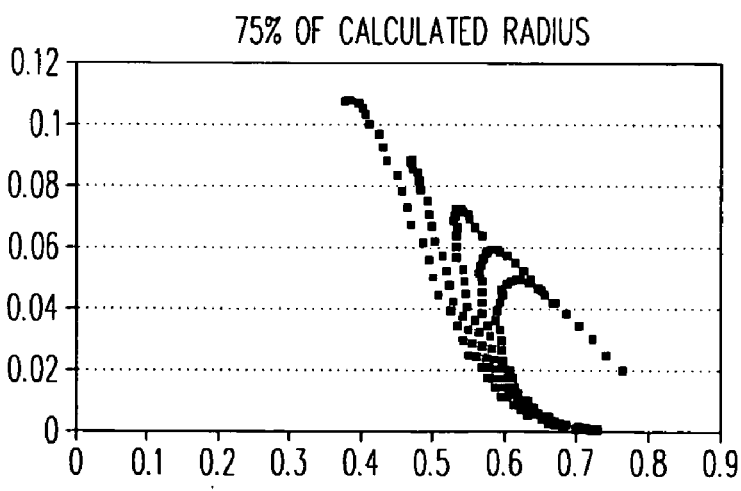

FIGS. 11-13 illustrate various curls of various waves as a function of the relative length of the attractor line to the attractor sphere. Each separate curled wave (1110, 1120, 1130, 1140 etc.) represents the shape of a wave in time as it curls. As is illustrated, generally, the smaller the length of the attractor line to the attractor sphere, the more pronounced the curling becomes.

Figure 14:
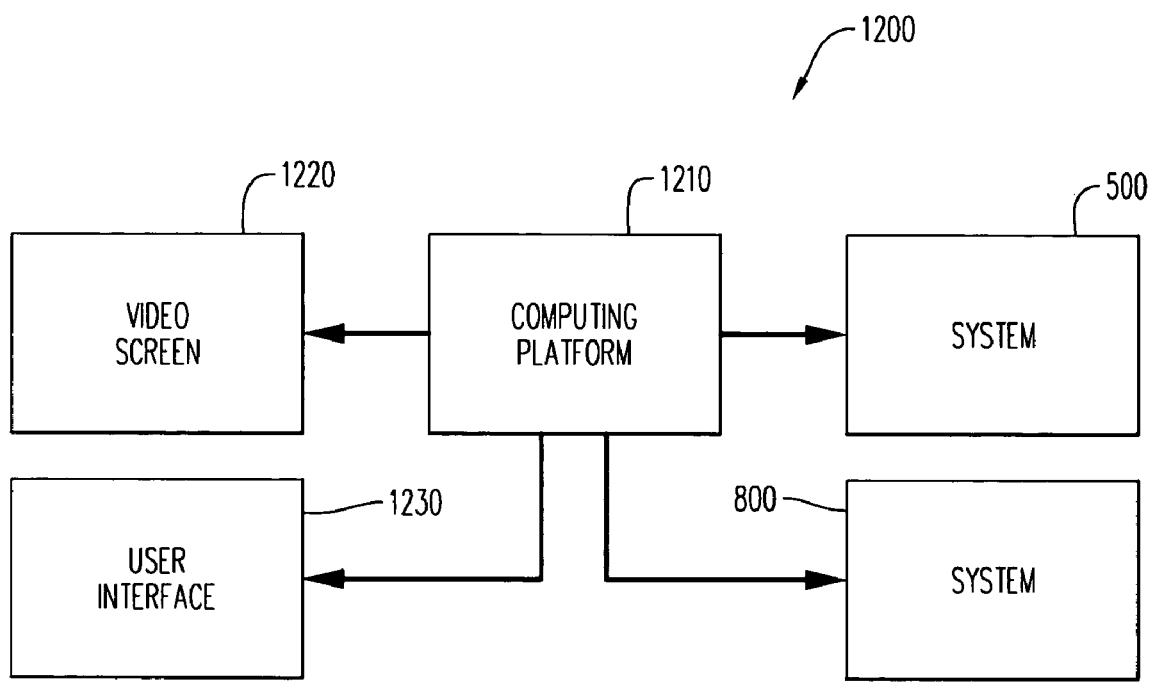
FIG. 14 illustrates a video system for displaying a rendered shallow or breaking wave.

FIG. 14 illustrates one embodiment in which a video platform 1200 in which system 500 and system 800 may be used. In video platform 1200, a computing platform 1210 is coupled to a video screen 1220. Computing platform 1210 is also coupled to a user interface 1220. Computing platform 1210 is also coupled to the system 500 and the system 800. Generally, the computing platform 1210 may, in some embodiments, coordinate an interplay between 1120, 1230, 1240, and 1250.

In some embodiments of video platform 1200, system 500 can be embodied in code in a storage medium, such as stored in a memory of computing platform 1210. For example, the storage medium can have a code for the first memory 510 to store a first signal representative of a distance between a surface of a liquid to a bottom of the liquid. The storage medium can also have code for a first sinusoidal generator 520 to generate a first sinusoidal signal representative of a wave at the surface of the liquid. The storage medium can also have code for a second memory 530 to store a first wavelength of the sinusoidal signal, and can have code for a threshold detector 570 to trigger if the distance between the surface of the liquid and the bottom of the liquid, represented by the first signal, is less than a selected proportion of the first wavelength as stored in the second memory. The storage medium can have code for a second wavelength determinor 575 to determine a second wavelength as a function of at least both the first wavelength and also the distance between the surface of the liquid to the bottom of the liquid after a triggering of the threshold detector 570. The storage medium also has code for a second sinusoidal generator 580 to generate a second sinusoidal signal as a function of at least the second wavelength. The storage medium can also have code for an input amplitude multiplier 595 to calculate a second wavelength wave amplitude of the second sinusoidal signal.

What is claimed is:

1. A video platform, comprising:
   a video screen;
   a storage medium;
   a computer coupled to the video screen, and the storage medium, wherein the storage medium comprises code to:
   generate a signal representative of at least one wave at a surface of a liquid;
   select a first wave point of the at least one wave;
   generate an attractor for the first wave point;
   generate an attractor line that represents the shortest distance between the first wave point and the attractor;
   calculate a position of a second wave point as a function of at least the attractor line; and
   display the at least one wave via the video screen.

2. The video platform of claim 1, wherein calculating the position of the second wave point is further based on a function of an acceleration of the first wave point in a vector direction of the attractor line.

3. The video platform of claim 1, wherein generating the attractor for the first wave point further comprises:
   determining a speed of the attractor; and
   shrinking the attractor to generate a smaller attractor that is generated at a displacement that is a function of at least the speed of the attractor.

4. The video platform of claim 3, wherein generating an attractor line further comprises:
   determining a placement of the first wave point; and
   generating a second attractor line as function of at least a speed of the smaller attractor and the placement of the first wave point.

5. The video platform of claim 4, further comprising generating a new second wave point as a function of the first wave point and the second attractor line.

6. The video platform of claim 3, wherein a size of the smaller attractor is a function selected from the group consisting of at least the distance between the surface of the liquid and the bottom of the liquid, a distance to shore of the attractor, and both.

7. The video platform of claim 1, further comprising calculating a position of a third wave point as a function of the second wave point, wherein the second wave point is located in a front of the wave.

8. The video platform of claim 1, wherein the attractor is a spherical attractor.

9. A system, comprising:
a first memory to store a first signal representative of a distance between a surface of a liquid and a bottom of the liquid;
an attractor generator;
an attractor line generator;
a first sinusoidal generator to generate a first sinusoidal signal representative of a wave at the surface of the liquid, wherein a first wave point of the wave is selected and an attractor is generated by the attractor generator for the first wave point, and wherein an attractor line is generated by the attractor line generator that represents a shortest distance between the first wave point and the attractor;
a second memory to store a first wavelength of the first sinusoidal signal;
a threshold detector to trigger if the distance between the surface of the liquid and the bottom of the liquid, represented by the first signal, is less than a selected proportion of the first wavelength as stored in the second memory;
a second wavelength determinor to determine a second wavelength as a function of at least both the first wavelength and also the distance between the surface of the liquid to the bottom of the liquid after a triggering of the threshold detector;
a second sinusoidal generator to generate a second sinusoidal signal as a function of at least the second wavelength;
an input amplitude multiplier to calculate a second wavelength wave amplitude of the second sinusoidal signal; and
a digital display output port to display the second wavelength wave amplitude of the second sinusoidal signal.

10. The system of claim 9, further comprising:
a steepness adjuster coupled to an evaluator and the second sinusoidal generator.

11. The system of claim 9, wherein the second wavelength is a value between the first wavelength and half of the value of the first wavelength.

12. The system of claim 11, wherein the first sinusoidal signal is a function of at least a physical displacement parameter across the surface of the liquid, a time parameter, or both.

13. The system of claim 11, wherein the second sinusoidal signal is an adjusted first sinusoidal signal.

14. A computer implemented method comprising:
storing a first signal representative of a distance between a surface of a liquid to a bottom of the liquid;
generating a first sinusoidal signal representative of a wave at the surface of the liquid,
storing a first wavelength of the first sinusoidal signal;
triggering if the distance between the surface of the liquid and the bottom of the liquid, represented by the first signal, is less than a selected proportion of the first wavelength as stored in a second memory;
determining a second wavelength as a function of at least both the first wavelength and also the distance between the surface of the liquid to the bottom of the liquid after the triggering of a threshold trigger;
generating a second sinusoidal signal as a function of at least the second wavelength;
calculating a second wavelength wave amplitude of the second sinusoidal signal, wherein an attractor line, generated by an attractor line generator, is stored in a first memory or the second memory, and wherein the attractor line represents the shortest distance between a first wave point and an attractor; and
displaying on a video screen the second wavelength wave amplitude of the second sinusoidal signal.

15. The method of claim 14, wherein the first memory and the second memory are double-speed data access memory.

* * * * *